(12) United States Patent
Khan (10) Patent No.: US 10,469,837 B2
(45) Date of Patent: Nov. 5, 2019

(54) VOLUMETRIC DISPLAY

(71) Applicant: Javid Khan, Edinburgh (GB)

(72) Inventor: Javid Khan, Edinburgh (GB)

(73) Assignee: Javid Khan, Edinburgh (GB)

( * ) Notice: Subject to any disclaimer, the term of this patent is extended or adjusted under 35 U.S.C. 154(b) by 67 days.

(21) Appl. No.: 15/870,601

(22) Filed: Jan. 12, 2018

(65) Prior Publication Data

US 2018/0220127 A1    Aug. 2, 2018

Related U.S. Application Data (63) Continuation of application No. PCT/GB2016/052326, filed on Jul. 28, 2016.

(30) Foreign Application Priority Data

Jul. 29, 2015    (GB) ................................ 1513333.3

(51) Int. Cl.
     *H04N 13/395*      (2018.01)
     *G02B 5/18*      (2006.01)
     *G02B 27/22*      (2018.01)
     *H04N 13/322*      (2018.01)

(52) U.S. Cl.
CPC ......... *H04N 13/395* (2018.05); *G02B 5/1828* (2013.01); *G02B 27/2278* (2013.01); *G02B 27/2292* (2013.01); *H04N 13/322* (2018.05)

(58) Field of Classification Search
CPC .. H04N 13/395; H04N 13/388; H04N 13/322; G02B 5/1828; G02B 27/2278; G02B 27/2292

See application file for complete search history.

(56) References Cited

U.S. PATENT DOCUMENTS 4,130,832 A    12/1978   Sher
8,500,284 B2 *   8/2013   Rotschild ........... G02B 27/2271
                                                         353/10

(Continued)

FOREIGN PATENT DOCUMENTS

CN      1810046 A      7/2006
CN      1918511 A      2/2007

(Continued)

OTHER PUBLICATIONS

Slinger et al: "Computer-Generated Holography as a Generic Display Technology", Aug. 2005.

(Continued)

*Primary Examiner* — Obafemi O Sosanya
(74) *Attorney, Agent, or Firm* — EIP US LLP (57) ABSTRACT

An apparatus for a volumetric display includes an imaging system having object and image planes, a source image generation apparatus for forming a source image in the object plane based on received image data, and a control apparatus for supplying image data to the source image generation apparatus. The source image generation apparatus includes a light source. The image data comprises a series of two-dimensional images. The imaging system includes a diffractive optical element and the control apparatus is arranged to generate at least one control signal to vary a wavelength of light emitted by the light source and/or a focal length associated with the diffractive optical element to vary the location of the image plane within a volume of real space in synchronism with the formation of the series of two-dimensional images in the object plane to construct a volumetric three-dimensional image based on the received image data.

20 Claims, 6 Drawing Sheets

(56) References Cited

U.S. PATENT DOCUMENTS

| | | | |
|---|---|---|---|
| 2001/0013960 A1 | 8/2001 | Popovich et al. | |
| 2009/0284489 A1* | 11/2009 | Batchko | H04N 13/388 |
| | | | 345/173 |
| 2011/0188116 A1 | 8/2011 | Ledentsov | |

FOREIGN PATENT DOCUMENTS

| | | |
|---|---|---|
| DE | 3419098 A1 | 11/1985 |
| EP | 0992163 A1 | 12/2000 |
| JP | 2002169124 A | 6/2002 |
| WO | 9818039 A1 | 4/1998 |
| WO | 0007061 A1 | 2/2000 |
| WO | 0135154 A1 | 5/2001 |
| WO | 0144858 A2 | 6/2001 |
| WO | 2009109785 A2 | 9/2009 |
| WO | 2014141018 A1 | 9/2014 |

OTHER PUBLICATIONS

Traub A.C.: "Stereoscopic Display Using Rapid Varifocal Mirror Oscillations", Appl. Opt. 6(6), 1085-1087 (1967).
Valley et al: "Tunable-focus flat liquid-crystal diffractive lens", Optics Letters, 35(3), pp. 336-338 (2010).
Search Report dated Jan. 18, 2016 for GB1513333.3.
International Search Report dated Nov. 24, 2016 for PCT Application No. PCT/GB2016/052326.
Chinese Office Action dated Aug. 30, 2019 for Chinese Application No. 2016800441853.

* cited by examiner

VOLUMETRIC DISPLAY

CROSS-REFERENCE TO RELATED APPLICATIONS

This application is a continuation of International Application No. PCT/GB2016/052326, filed Jul. 28, 2016, which claims priority to GB Application No. GB1513333.3, filed Jul. 29, 2015, under 35 U.S.C. § 119(a). Each of the above-referenced patent applications is incorporated by reference in its entirety.

BACKGROUND

Technical Field

The present disclosure relates to a method and apparatus for a volumetric display that can be used in a wide range of applications requiring three-dimensional (3D) visualization.

Description of the Related Technology 3D visualization is important for many industrial, scientific and commercial applications. For example, 3D visualization is used for medical imaging, in military and security applications, for 3D television and so on. Whereas it is straightforward to generate 3D information, presenting this 3D information for viewing has proven much more difficult. Conventional stereoscopic approaches with eyewear or lenticular lens systems are really "twin-2D" optical illusions with an image aimed at either eye, and provide a poor 3D experience. In particular, these technologies fundamentally lack the correct 3D visual depth cues (vergence, motion parallax and accommodation) required by the human visual response system, leading to eye strain and fatigue.

Volumetric displays belong to a class of three-dimensional display technologies that produce volume-filling imagery. The volume is typically divided into identical volume elements, or voxels, positioned on a 3D grid (in an analogous manner to picture elements, or pixels, positioned on a two-dimensional (2D) grid in a two dimensional display). A 3D image is constructed by activating selected voxels. The display is usually controlled by a computer to generate moving images in color. Volumetric displays are autostereoscopic so viewers do not require any additional equipment like eyewear or headsets to view the three dimensional image. Furthermore, the image is visible by any number of viewers.

There are many technical approaches to producing volumetric displays, for example bouncing light beams off smoke or a fine mist, providing banks of interconnected LEDs suspended in a volume, lighting up plasma dots within a gas using intersecting laser beams to stimulate plasma discharges, or energizing particles within the volume via two-photon absorption.

A common category of volumetric displays includes a closed volume display that uses the principle of swept volume projection. Such volumetric displays can be based on mechanical methods, such as arrays of LEDs that spin very quickly around an axis and are modulated in full color, thus presenting the eye with the illusion of a volumetric display. Similar approaches include moving reflective screens, utilizing either translational or rotational motion, synchronized with a projector. A non-mechanical variant uses a series of planar liquid crystal shutters stacked on top of each other. Each liquid crystal layer changes rapidly from a transparent to light scattering state, forming a series of adjacent image-planes at differing depths.

The paper entitled "Stereoscopic Display Using Rapid Varifocal Mirror Oscillations" by A. C. Traub, Appl. Opt. 6(6), 1085-1087 (1967) and U.S. Pat. No. 4,130,832 both discuss displays that utilize varifocal spherical mirrors to sweep an image plane imaging a CRT display to create a volume. The image planes are in virtual space, i.e. the viewer has to look through the mirror to see the volume. A small movement of a few millimeters (mm) of the mirror leads to large volume sweeps. Such swept-volume displays have proven difficult to realize in practice. The optical components are bulky and the volumetric display is not scalable. Further, as the images are not in real space (i.e. in mid-air), interoperability with the display is restricted.

A three-dimensional volumetric display is presented in WO 01/44858 by Zhan He of Reveo Inc., USA. The display has a flat panel with a variable focal length microlens array that creates voxels by focusing images at different locations. The microlens array can be fabricated on a flat panel using active matrix semiconductor fabrication techniques.

Holograms can produce three-dimensional images. A hologram stores diffraction patterns that cause incident light to interfere constructively and destructively to create optical wavefronts. A hologram can store frequency, amplitude and phase information to reconstruct a three-dimensional image. Accordingly, there has been interest in using holograms for 3D visualization.

Computer-Generated Holographic (CGH) displays provide high-resolution 3D imaging using spatial light modulation (SLM) technology. SLMs are digitally programmable diffractive holographic elements that can modulate the phase and/or amplitude of coherent light. A computer calculates the diffraction pattern corresponding to a 3D image, and then transfers the calculated diffraction pattern to the SLM. Examples of CGH displays are discussed in EP 0992163, entitled "Autostereoscopic Display" by A. Travis of Cambridge University, UK, an article in the IEEE Computer Magazine 2005 entitled "Computer Generated Holography as a Generic Display Technology" by Chris Slinger et al, Qinetiq Malvern, UK, and U.S. Pat. No. 8,500,284 by Rotschild et al of Real View Imaging Ltd, Israel.

In a CGH display, the SLM behaves like a programmable holographic film. As such, the pixel feature size of the SLM needs to be similar to the size of grains within a holographic film emulsion. This requires nanoscale semiconductor technologies that are far more advanced than the current micron scale feature sizes found in microdisplays. In addition, CGH requires significant computational power to calculate the required diffraction patterns. Accordingly, at present CGH displays are not feasible for many applications due to prohibitive cost and technical challenges.

WO 2009/109785 discusses a holographic volumetric display that utilizes a spatial multiplexing approach to create individual voxels. The system discussed in WO 2009/109785 has limits on the number of voxels that can be created, which depends on the extent to which a holographic interference pattern can be sampled and multiplexed. Hence, the holographic volumetric display of WO 2009/109785 is difficult to scale towards high-resolution displays.

SUMMARY

According to a first aspect of the present disclosure, there is provided a volumetric display having imaging apparatus including a diffractive optical element. The imaging apparatus is arranged to provide a series of image planes within a volume of real space, each image plane corresponding to a respective different focal length of the diffractive optical element, so as to generate a three-dimensional image. The use of a diffractive optical element has several potential advantages, including: the capability of producing real-space images, the capability for non-mechanical volume-sweeping, the potential to reduce the bulk associated with traditional refractive or reflective optics, thus leading to more compact and lower cost systems, and/or the capability of realizing shorter focal distances with f-numbers approaching unity or less.

Some embodiments provide apparatus for a volumetric display. The apparatus includes an imaging system having an object plane and an image plane. The apparatus includes a source image generation apparatus for forming a source image in the object plane in accordance with received image data. The source image generation apparatus includes a light source. The apparatus includes a control apparatus for supplying image data to the source image generation apparatus. The image data corresponds to a series of two-dimensional images. The imaging system includes a diffractive optical element and the control apparatus is arranged to generate at least one control signal to vary at least one of a wavelength of light emitted by the light source and a focal length associated with the diffractive optical element to vary the location of the image plane within a volume of real space in synchronism with the formation of the series of two-dimensional images in the object plane so as to construct a volumetric three-dimensional image in accordance with the received image data.

Some embodiments provide a method of constructing a volumetric image in accordance with three-dimensional image data. The method includes sequentially forming a series of two-dimensional images in accordance with received image data. The method includes, in synchronism with forming the series of images, varying the location of the image plane so that each of the series of images is formed in a respective image plane so as to construct a volumetric three-dimensional image. The forming of the sequence of images includes transmitting of light through a diffractive optical element. The varying of the location of the image plane includes adjusting at least one of i) a wavelength of the light transmitted through the diffractive optical element, and ii) a focal length associated with the diffractive optical element.

Further features and advantages of the disclosure will become apparent from the following description of embodiments of the disclosure, given by way of example only, which is made with reference to the accompanying drawings.

DETAILED DESCRIPTION

First Embodiment

Figure 1:
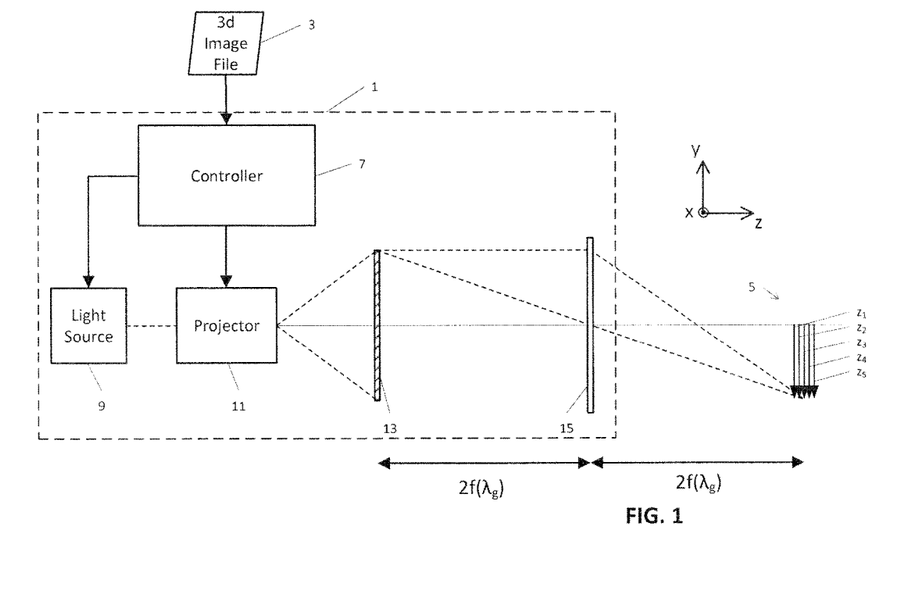
FIG. 1 schematically shows a block diagram illustrating the main components of a volumetric display, forming a first embodiment of the disclosure.

The volumetric display 1 of FIG. 1 processes 3D image data in a 3D image file 3 to generate a volumetric three-dimensional image 5. In this embodiment, the 3D image data in the 3D image file specifies brightness values corresponding to a 3D object, but not color values. The volumetric display 1 includes a controller 7 that is connected to a light source 9 and a projector 11. The volumetric display 1 also includes a diffusion screen 13 and a diffractive optical element 15.

The light source 9 is a narrowband tunable light source whose frequency is controlled by a control signal from the controller 7. An example of a suitable tunable light source may be based on a broadband white light source that is filtered by a narrowband acousto-optic tunable filter (AOTF) to vary the wavelength of output light. Other sources may include arrays of lasers or narrowband light-emitting diodes (LEDs) with each array element centered on a different wavelength.

The projector 11 is a conventional projector arrangement that, under illumination by the light source 9, projects a two-dimensional image onto the diffusion screen 13 corresponding to two-dimensional image data received from the controller 7. In this embodiment, the projector 11 includes a spatial light modulator based on microdisplay technology such as Liquid Crystal on Silicon (LCoS) or Digital Micromirror Devices (DMDs).

In this embodiment, the diffractive optical element 15 is a passive holographic optical element having a diffraction pattern that provides, using the optical effects of diffraction and interference, a focusing effect with an associated focal length f. In particular, in this embodiment the diffractive optical element is a Fresnel Phase Plate, which is a transmissive diffractive optical element that performs a converging lens function. In other words, the diffractive optical element 15 acts as a diffractive converging lens with focal length f.

The diffractive optical element 15 exhibits chromatic dispersion so that the focal length f associated with the diffractive optical element 15 varies for different wavelengths of light. In this embodiment, the diffractive optical element 15 is positioned a distance 2fg behind the diffusion screen 13 with respect to the projector 11, where fg is the focal length of the diffractive optical element 15 at a wavelength λg that is approximately in the middle of the tunable range of the light source 9 (in the green region of the spectrum).

The diffusion screen 13 acts as an object plane within an imaging system including the diffractive optical element 15, and a corresponding image plane for light at the wavelength λg is formed a distance 2fg beyond the diffractive optical element 15 in accordance with the thin lens formula. The light source 9, the projector 11 and the diffusion screen 13 generate a source image in the object plane of the imaging system including the diffractive optical element 15 in accordance with received image data.

Figure 2:
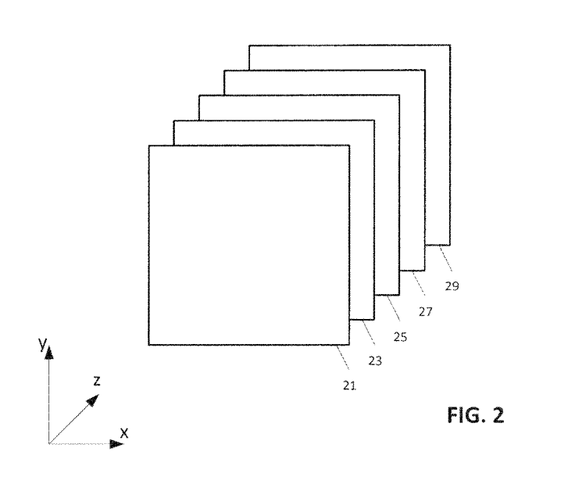
FIG. 2 shows a series of reconstructed image planes produced by the volumetric display of FIG. 1.

As indicated in FIG. 1, the image formed in the image plane is inverted with respect to the source image formed in the object plane with a magnification factor of 1 (i.e. the same size as image in the object image). At other wavelengths, the distance of the image plane beyond the diffractive optical element 15 will vary due to the variation of the focal length of the diffractive optical element 15 with wavelength. Also, the magnification for the images formed will vary with wavelength. The magnification factor is greater than 1 for wavelengths greater than λg and less than one for wavelengths less than λg. As such, five different image planes are illustrated in FIG. 1 at locations z1, z2, z3, z4, z5, the positions respectively corresponding to respective different adjacent wavelengths λ1, λ2 . . . λ5, at varying distances from the diffractive optical element 15. If the wavelengths are sufficiently close and narrowband then the arrangement produces a series of image planes that are placed close together to approximate a volumetric display. These five image planes are shown in more detail in FIG. 2, referenced 21, 23, 25, 27 and 29. It will be appreciated that there may be more or less than five image planes.

In this embodiment, the 3D image data 3 can be in any three-dimensional data format or co-ordinate system including point cloud data, polygon meshes, volumetric data, Computer Aided design (CAD) format etc. The controller 9 has a processor (not shown) that first translates the three-dimensional data to a volumetric object representation as a series of unit volumes, referred to herein as voxels, in a three-dimensional Cartesian co-ordinate system corresponding to the illustrated x-axis, y-axis and z-axis, for the three-dimensional image 5. The processor then splits the volumetric object data into a series of two-dimensional image slices, corresponding to x-y planes in FIGS. 1 and 2, which are normal planes with respect to the optical axis, which is parallel to the z-direction in FIG. 1, of the projector 11. Controller 9 scales, inverts or normalizes the intensity of the x-y image planes appropriately for uniform presentation of the x-y planes along the z-direction.

The controller 7 sequentially sends the two-dimensional image data for the two-dimensional images in the x-y planes to the projector 11 in synchronism with sending a control signal to the light source 9 that controls the wavelength of light output by the light source 9. Each of the sequence of two-dimensional images is projected by the projector 11 onto the diffusion screen 13 to generate a source image in the imaging system including the diffractive optical element 15. By varying the wavelength of the light output by the light source 9 for each of the series of two-dimensional images in dependence on the position of the x-y plane corresponding to each two-dimensional image in the z-direction in accordance with the three-dimensional image data 3, sources images corresponding to the series of two-dimensional images projected onto the diffusion screen 13 are sequentially formed in respective different planes in real space so as to construct a three-dimensional image corresponding to the 3D image data in the 3D image file. In other words, the control signal sent by the controller 7 to the light source 9 varies the wavelength of light emitted by the light source 9 to vary the location of the image plane within a volume of real space. As such, the first embodiment takes advantage of the inherent chromatic dispersion property associated with the diffractive optical element 15 to produce a series of image planes, each image plane corresponding to a different wavelength of light emitted by the light source 9.

By sending the control signal in synchronism with the formation of the series of two-dimensional images in the object plane, a three-dimensional image is constructed. In this embodiment, the controller 7 cycles through the series of two-dimensional images with each cycle having a duration of 20 ms or less. In this way, persistence of vision in the human eye causes the three-dimensional image corresponding to the 3D image data in the 3D image file 3 to appear continuously.

Second Embodiment

In the first embodiment, the chromatic dispersion of the diffractive optical element 15 is used to vary the position of the x-y image plane in order to construct a 3D image. As such, the x-y image planes have associated colors which vary from one end of the emission spectrum of the tunable light source 9 for x-y image planes proximate the diffractive optical element 15 to the other end of the emission spectrum of the tunable light source 9 for x-y image planes distal to the diffractive optical element 15. For some applications, such a variation in color is not acceptable.

Figure 3:
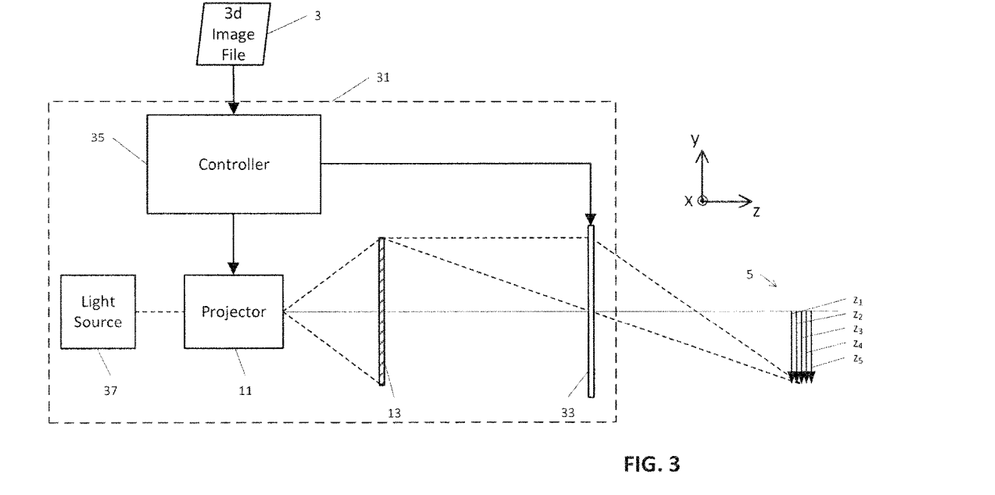
FIG. 3 schematically shows a block diagram illustrating the main components of a volumetric display, forming a second embodiment of the disclosure.

A second embodiment will now be described with reference to FIG. 3 in which the position of the x-y image plane is varied by varying the focal length associated with the diffractive optical element. In FIG. 3, components that are identical to corresponding components in the first embodiment are referenced with the same numeral and will not be described in detail again.

The volumetric display 31 of the second embodiment includes an active diffractive optical element 33 for which the associated focal length varies in response to a control signal from the controller 35. In this embodiment, the active diffractive optical element 33 is as described in the article entitled "Tunable-focus flat liquid-crystal diffractive lens," by P. Valley et al in Optics Letters, 35(3), pages 336-338 (2010). As discussed in that article, the active diffractive optical element 33 includes a liquid crystal diffractive lens having Fresnel zone structured electrodes. The refractive index of the liquid crystal varies in response to an applied voltage, thereby varying the focal length associated with the active diffractive optical element 33.

In this embodiment, the light source 37 is a narrowband light source having a constant wavelength. The controller 35 receives the 3D image file 3, and processes the three-dimensional image data 3 contained therein into data for a series of 2D image slices and then sequentially sends the 2D Image data for the series of 2D image slices to the projector 11 in the same manner as in the first embodiment. In synchronism with the sending of 2D image data for a 2D image slice to the projector 11, the controller 35 sends a control signal to the active diffractive optical element 33 to vary the focal length associated with the active diffractive optical element 33 to a value for that 2D image slice. By varying the focal length 'f' for each of a series of five 2D image slices to values f1, f2, f3, f4, f5 in dependence on the position of the x-y plane corresponding to each image in the z-direction in accordance with the 3D image data, a series of five 2D images are formed along the optical axis of the projector 11 in respective different planes z1, z2, z3, z4, z5 in real space so as to construct a three-dimensional image corresponding to the 3D image data in the 3D image file. In other words, the control signal sent by the controller 35 to the active diffractive optical element 33 varies the focal length of the active diffractive optical element 33 to provide a series of image planes within a volume of real space to construct a three-dimensional image. It will be appreciated that there may be more or less than five 2D image slices, with a corresponding change in the number of image planes.

As in the first embodiment, the controller 35 scales, inverts or normalizes the intensity of the x-y image planes appropriately for uniform presentation of the x-y planes along the z-direction. The controller 35 also cycles through the series of 2D image slices with each cycle having a duration of 20 ms or less so that the series of 2D image slices appear as a 3D image corresponding to the 3D image data in the 3D image file 3. In the second embodiment, as the wavelength output by the light source does not change, the 3D image is monochromatic.

Third Embodiment

Figure 4:
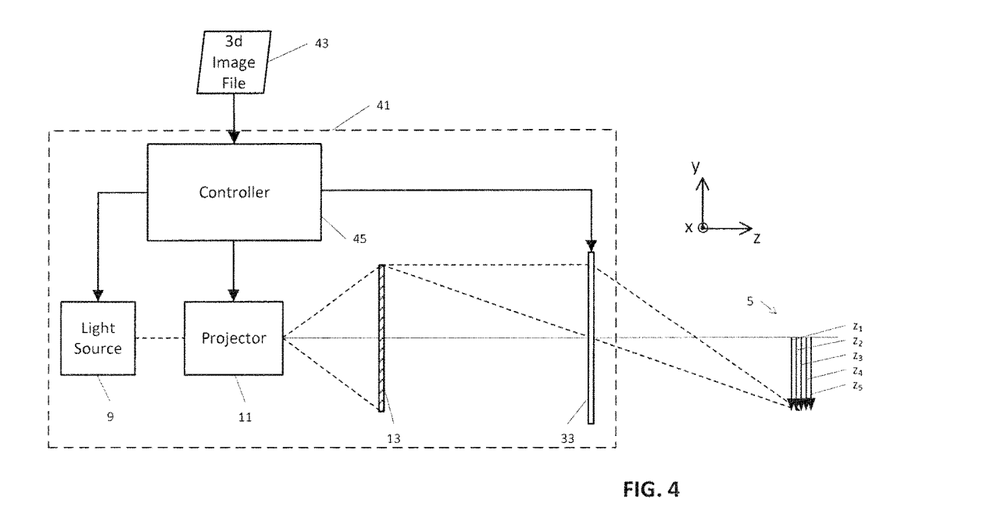
FIG. 4 schematically shows a block diagram illustrating the main components of a volumetric display, forming a third embodiment of the disclosure.

As discussed above, the volumetric display 31 of the second embodiment produces a monochromatic 3D image corresponding to a 3D image data that has no color information. A third embodiment will now be described with reference to FIG. 4 in which a volumetric display 41 produces a 3D image in color corresponding to color 3D image data in a 3D image file 43. The volumetric display of the third embodiment includes both a narrowband tunable light source 9, as in the first embodiment, and an active diffractive optical element 33, as in the second embodiment. The volumetric display of the third embodiment produces a monochromatic red volume, a monochromatic green volume and a monochromatic blue volume that overlap spatially to produce a color volume. In FIG. 4, components that are identical to corresponding components in the second embodiment are referenced with the same numeral and will not be described in detail again.

In this embodiment, the 3D image file 43 stores 3D image data in a color format. The controller 45 processes the 3D image data stored in the 3D image file 43 to generate volumetric object representations for each of the colors red, green and blue in accordance with the color information of the 3D image data in the 3D image file 43. The controller 45 then splits the red volumetric object representation into data for a series of red 2D image slices, splits the green volumetric object representation into data for a series of green 2D image slices corresponding to the same image planes as the series of red 2D images, and splits the blue volumetric object representations into data for a series of blue 2D image slices corresponding to the same image planes as the series of red 2D image slices and the series of blue 2D image slices.

The controller 45 then sequentially sends the data for the 2D image slices to the projector 11. For each 2D image slice, in synchronism with sending the data for the 2D image slice to the projector 11, the controller sends a first control signal to the light source 9 to set the wavelength of the light source 9 in dependence on the color associated with the 2D image slice (i.e. red, green or blue), and sends a second control signal to the active diffractive optical element 33 to set the focal length for the diffractive optical element 33 in dependence on the position of the 2D image slice in the z-direction. The setting of the focal length of the diffractive optical element 33 needs to take into account the wavelength of the light source for the 2D image slice (i.e. red, green or blue). In other words, the control signals sent by the controller 45 to the light source 9 and the active diffractive optical element 33 varies the wavelength of light emitted by the light source 9 and the focal length of the active diffractive optical element 33 to provide a series of image planes within a volume of real space to construct a three-dimensional image.

As in the first and second embodiments, the controller 45 scales, inverts or normalizes the intensity of the x-y image planes appropriately for uniform presentation of the x-y planes along the z-direction. In addition, the controller 35 ensures correct color blending of red, green and blue x-y planes in accordance with the CIE chromacity space or other color spaces. The controller 45 cycles through the 2D image slices with each cycle having a duration of 20 ms or less so that the series of 2D image slices appear as a 3D image corresponding to the 3D image data in the 3D image file 3. In this embodiment, the order in which the 2D image slices is cycled is the red 2D image slices, followed by the green 2D image slices and then the blue 2D image slices. In this way, the changing of the wavelength of the light source 9 is minimized. Alternative ordering could be used, for example to minimize the changing of the focal length of the diffractive optical element 33.

Fourth Embodiment

Figure 5:
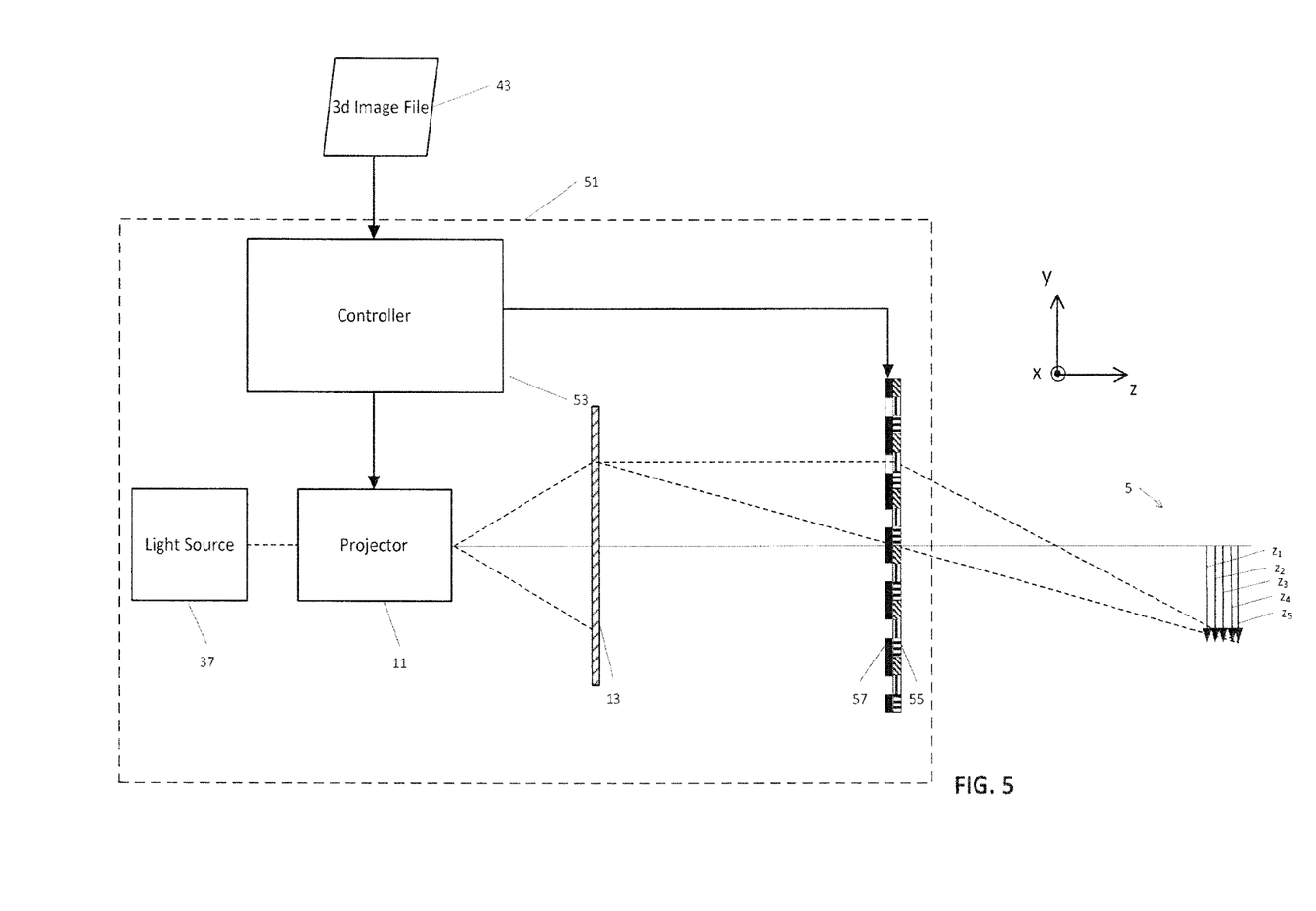
FIG. 5 schematically shows a block diagram illustrating the main components of a volumetric display, forming a fourth embodiment of the disclosure.

The diffractive optical elements of the first to third embodiments each act as a lens with a single focal length that varies as a function of wavelength, although in the second and third embodiments that focal length can be adjusted continuously by sending an appropriate control signal. The active diffractive optical element in the second and third embodiments is a complex and expensive optical component. A fourth embodiment will now be described with reference to FIG. 5 in which a color volumetric display is realized based on a switchable diffractive lens with three discrete focal lengths together with a tunable light source to produce three overlapping red, green and blue volumes. In FIG. 5, components that are identical to corresponding components in previous embodiments are referenced with the same numeral and will not be described in detail again.

The composite diffractive optical element is fabricated, using methods described in WO 2009/109785, to have a first focal length, a second focal length and a third focal length for which the first focal length in a red spectral sub-band (centered for example at 630 nm) overlaps the second focal length in a green spectral sub-band (centered for example at 530 nm) and the third focal length in a blue spectral sub-band (centered for example at 440 nm). In particular, the composite diffractive optical element comprises three different passive diffractive optical elements, known as sub-elements, that are spatially sampled and interlaced, arranged as tiles with each tile comprising three samples containing part of the diffraction pattern. Each stored sub-element is selected by means of a spatial mask provided by a liquid crystal shutter.

In this embodiment, the diffractive optical element 55 has an array of tiles, similar to RGB sub-pixels in a color liquid crystal display, with each tile having an array of three samples of diffraction patterns, one for each of the first, second and third focal lengths. A shutter mask array 57 is positioned adjacent to the composite diffractive optical element 55, which allows light to pass through one sample of a tile corresponding to one diffractive sub-element and masks the other two. In this manner, the shutter mask array 57 enables selective switching between the three diffractive optical sub-elements. The configuration shown in FIG. 5 shows the middle sample in each tile being selected, corresponding to the green samples for the green-centered diffractive sub-element.

With reference to FIG. 5, the volumetric display 51 of the fourth embodiment has a light source 37 that is a narrowband light source having a variable wavelength in a similar manner to the light source of the first embodiment. The controller 53 receives a color 3D image file 43, and processes the three-dimensional image data 3 contained therein into data for a series of 2D image slices in the red spectral sub-band, in the green spectral sub-band and in the blue spectral sub-band, and then sequentially sends the 2D Image data for the series of 2D image slices to the projector 11 in synchronization with a specific color in a similar manner to the first embodiment.

The controller 53 first selects the red focal plane by sending a control signal to the shutter mask array 57 to select the red-centered diffractive optical sub-element, and sweeps the light source around this center wavelength in synchronism with the projector 11 projecting the series of 2D images in the red spectral sub-band onto a diffusion screen 13, that forms the object plane of an imaging system incorporating diffractive optical elements 55 and shutter array 57, thereby creating a red volume of x-y planes. Analogous operations are repeated for the green and blue planes, thereby creating a color volumetric space given that the red, green and blue center focal points are spatially overlapping.

As such, the imaging system has a single object plane, formed by the diffusion screen 13 as mentioned above, and a series of image planes.

As in the third embodiment, controller 53 scales, inverts or normalizes the intensity of the x-y image planes appropriately for uniform presentation of the x-y planes along the z-direction. In addition, controller 53 ensure correct color blending of red, green and blue x-y planes in accordance with the CIE chromacity space or other color spaces. The controller 53 cycles through the 2D image slices with each cycle having a duration of 20 ms or less so that the series of 2D image slices reconstruct a 3D image corresponding to the 3D image data in the 3D image file 43.

This arrangement will affect the brightness of the transmitted light and the shutter mask pattern will impact the visual quality of the reconstructed x-y image planes, which depends on the size of the tiles and their constituent elements. Typically, these will be similar dimensions to pixels and sub-pixels in a LCD e.g. 300 microns for the tile and 100 microns for each sample.

Fifth Embodiment

Figure 6:
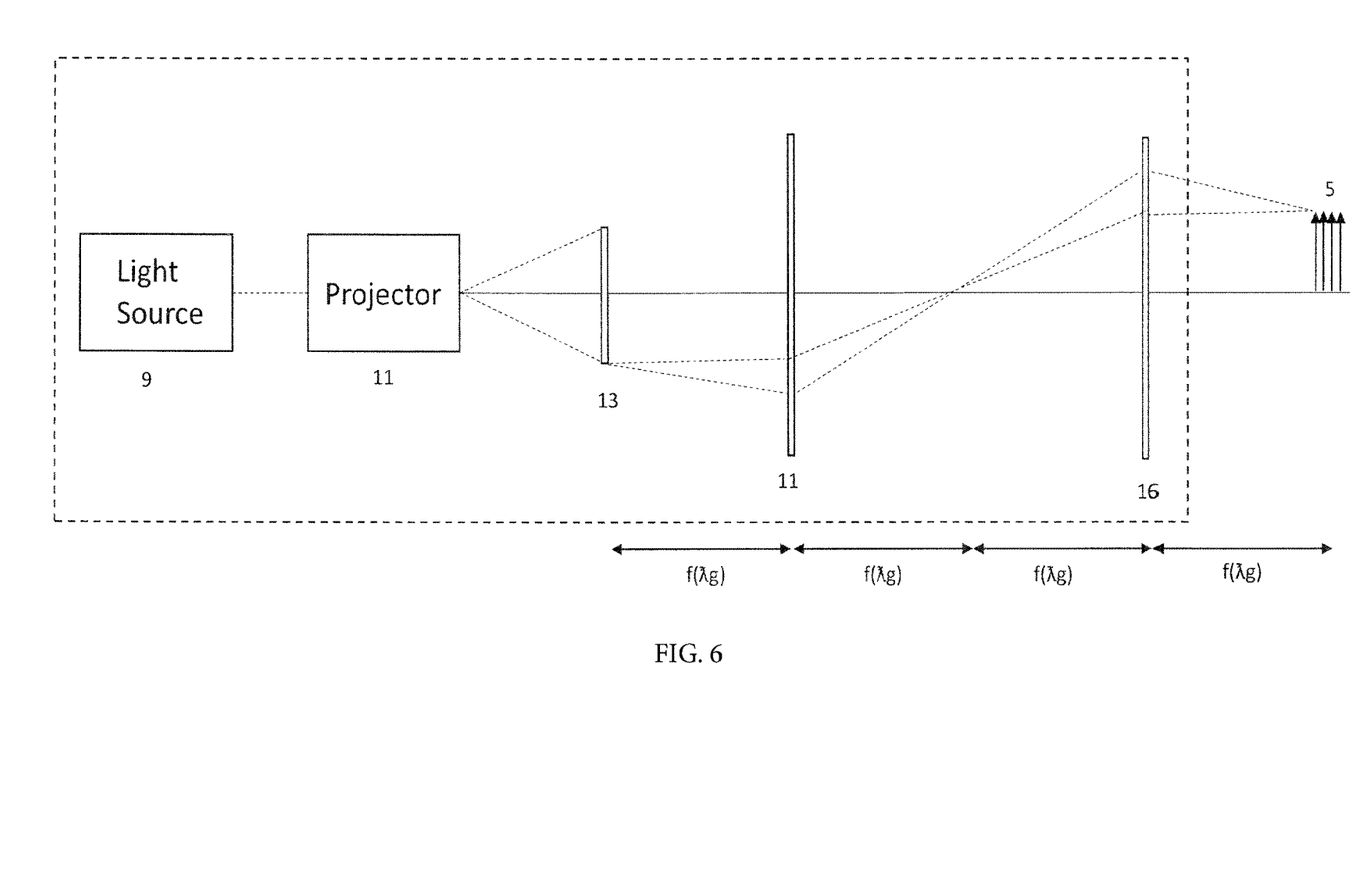
FIG. 6 schematically shows a block diagram illustrating the main components of a volumetric display, according to a fifth embodiment of the disclosure.

The previous embodiments are based on a single main diffractive optical element which is used as a chromatic dispersive component or a composite diffractive component to sweep a volume of real space. As shown in FIG. 6, the fifth embodiment utilizes two or more such diffractive optical elements (11, 16) arranged in a classical 4f, telescopic or similar configuration such that light from an object image plane placed around the central focal point of the first diffractive optical element 11 is collimated and then refocused by the second element 16 to form the image plane around its central focal point in real space. This configuration is also subject to changes in position and magnification, with corresponding changes in wavelength, of the observed image planes 5, similar to the first embodiment.

The fifth embodiment potentially requires fewer wavelengths as the shift in the observed image plane position can be more dramatic than when using a single diffractive optical element, as in the previous embodiments. This is because it combines the effect of two diffractive optical elements, with each element contributing to chromatic dispersion.

Another advantage of the configuration of the fifth embodiment is that image reconstruction is closer to the second diffractive component 16, which means a wider viewing angle. Also, it is possible to perform image processing by placing filters or other optical components in the Fourier plane between the two elements (11,16).

Modifications and Further Embodiments

The above embodiments are to be understood as illustrative examples of the disclosure. Further embodiments of the disclosure are envisaged.

In the fourth embodiment, it is appreciated that the composite diffractive optical element can store more than three sets of diffractive components. For example, it is possible to store 64 different sub-elements arranged in an 8×8 array. Such a configuration would be able to reproduce 64 distinct focal planes.

Although the color displays discussed above use a red, green and blue color space, it will be appreciated that other color spaces are possible.

In the third embodiment, a single narrowband tunable light source is used to output selectively light at three different wavelengths, in particular a red wavelength, a green wavelength and a blue wavelength. It will be appreciated that in an alternative embodiment, separate narrowband red, green and blue light sources could be employed with the controller selecting the appropriate light source for a 2D image.

Variations on the fifth embodiment may include a refractive element as any of the components, or a switchable diffractive element, or any combination of these.

Figure 8:
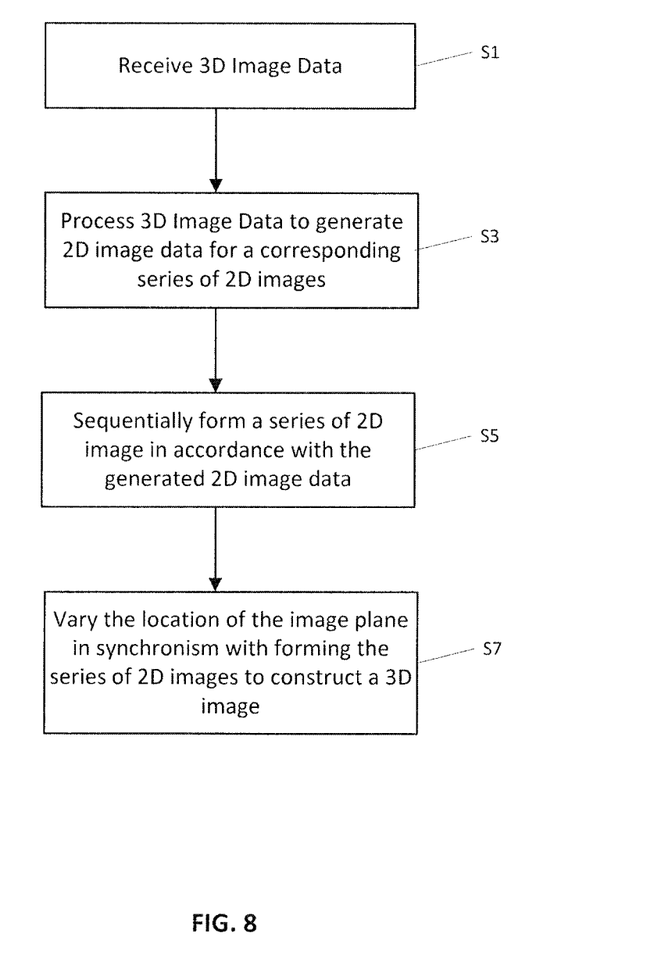
FIG. 8 is a flow chart showing a method of operation of a volumetric display, according to an embodiment of the disclosure.

The operation of all the embodiments described above will now be summarized with reference to FIG. 8. Three-dimensional image data is received, at S1, and processed, at S3, to generate 2D image data for a corresponding series of 2D images. Those 2D images are then sequentially formed, at S5, and the location of the image plane is varied, at S7, in synchronism with forming the series of images so as to construct a volumetric three-dimensional image. As discussed above, the forming of the sequence of images comprises transmitting of light through a diffractive optical element; and the varying of the location of the image plane comprises adjusting at least one of i) a wavelength of the light transmitted through the diffractive optical element and ii) a focal length associated with the diffractive optical element.

It will be appreciated that the data received by the volumetric display may be pre-processed as 2D image data for a series of 2D images, in which case the volumetric display can proceed directly using the received 2D image data.

Figure 7:
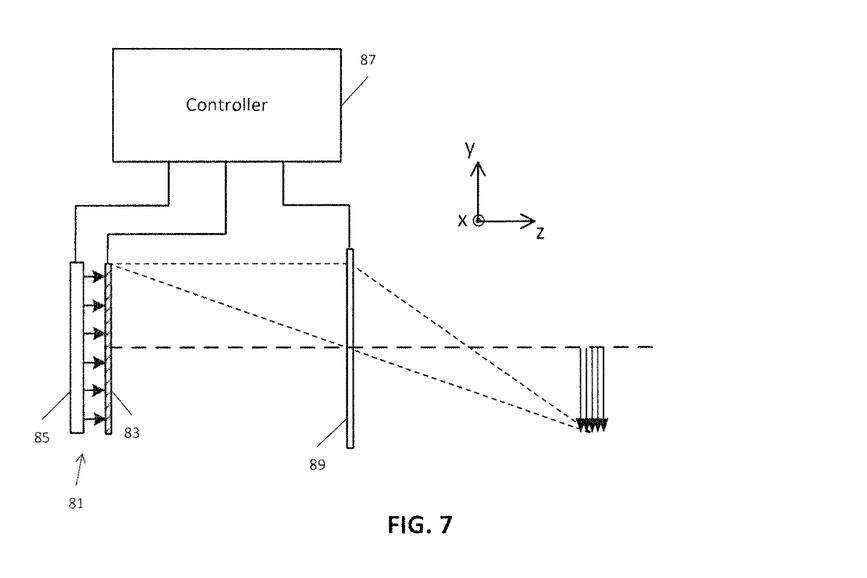
FIG. 7 schematically shows the main components of an alternative imaging system for a volumetric display, according to an embodiment of the disclosure.

In the above-described embodiments, a source image is formed in the object plane of the imaging system incorporating the diffractive optical element by projecting an image onto a diffusive screen. Alternative source image generation apparatus can be used to form the source image in the object plane of the imaging system. For example, as shown in FIG. 7, an imaging screen 81 can be formed by an array of liquid crystal shutters 83 provided adjacent a tunable backlight 85. A controller 87 sends control signals to the array of liquid crystal shutters 83 to switch selectively individual shutter elements between scattering and transmissive modes in accordance with image data. In this way, a source image is formed by the array of liquid crystal shutters. The source image may then be imaged by a diffractive optical element 89 into one of a plurality of image planes using the techniques discussed above. It will be appreciated that depending on the technique used, the controller 87 may send control signals to one or both of the backlight 83 and the diffusive optical element 89. Alternatively, the source image generation apparatus may be formed by an array of light emitters.

Embodiments of the disclosure describe a controller that performs basic image processing functions including inversion, scaling, color mixing/balancing and/or normalization. These functions could be extended to include corrections for any optical distortions or aberrations arising along the optical path, due to the diffractive optical element or elsewhere such as the projection optics. Such corrections may cover barrel, pin-cushion or moustache distortion as well as tilt, spherical aberration, field curvature amongst others. Correction of such optical artefacts would require prior measurements and computation of appropriate correction patterns.

The embodiments describe converging lens functions performed by dispersive diffractive optical elements such as a Fresnel Phase Plate. The diffractive optical element may include more intricate or expanded optical functions including multiple elements, lenslet arrays, cylindrical lenses and so on.

The above embodiments include a projector and a diffusion screen imaged at a distance of 2f to obtain unity magnification. This arrangement can lead to a long optical path length, being equal to 4f. It is appreciated that other optical geometries are possible. One method of reducing the optical path length is to employ a projector with collimating optics placed at the focal plane of the diffractive lens. This would cause a real image to be formed at f, thus reducing the overall optical path to 2f. The diffuser is not required in this embodiment. In such an arrangement, the object plane of the imaging system including the diffractive optical element is the spatial light modulator within the projector.

The above embodiments refer to using diffractive optical elements. A diffractive optical element is made using micro or nano scale fabrication techniques such as photolithography involving masking and etching, and maskless techniques including electron-beam writing or direct-write laser or optical lithography. Nano-scale diffractive optical elements are often referred to as photonic crystals. Alternatively, a diffractive optical element can be fabricated using classical interference holography with a reference and object beam within a suitable photosensitive medium including photopolymer, silver halide, dichromated gelatine or similar. Diffractive optical elements fabricated using holographic techniques are often referred to as holographic optical elements.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. An apparatus for a volumetric display, the apparatus comprising:
   an imaging system having an object plane and an image plane;
   a source image generation apparatus for forming a source image in the object plane in accordance with received image data, the source image generation apparatus comprising a light source; and
   a control apparatus for supplying image data to the source image generation apparatus, the image data corresponding to a series of two-dimensional images,
   wherein the imaging system comprises a diffractive optical element and the control apparatus is arranged to generate at least one control signal to vary at least one of a wavelength of light emitted by the light source and a focal length associated with the diffractive optical element to vary the location of the image plane within a volume of real space in synchronism with the formation of the series of two-dimensional images in the object plane so as to construct a volumetric three-dimensional image in accordance with the received image data.

2. The apparatus according to claim 1, wherein the diffractive optical element has a focal length that varies with optical frequency, and wherein the control apparatus is arranged to generate a control signal to vary the optical frequency of the light source to provide the series of image planes.

3. The apparatus according to claim 1, wherein the diffractive optical element is a composite diffractive optical element having an array of spatially separated sub-elements, each sub-element having a respective focal length,
   wherein the composite diffractive optical element further comprises an array of shutter elements, each shutter element to control illumination of one or more sub-elements of the diffractive optical element, and
   wherein the control apparatus is arranged to generate a first control signal to address selectively the array of shutter elements to select the focal length, and to generate a second control signal to vary the optical frequency of the light source to provide the series of image planes.

4. The apparatus according to claim 3, wherein the composite diffractive element comprises a first sub-element having a first focal length, a second sub-element having a second focal length and a third sub-element having a third focal length, wherein the first focal length in a first spectral sub-band overlaps the second focal length in a second spectral sub-band and the third focal length in a third spectral sub-band.

5. The apparatus according to claim 4, wherein the first spectral sub-band corresponds to a red region of the spectrum, the second spectral sub-band corresponds to a green region of the spectrum and third spectral sub-band correspond to a blue region of the spectrum.

6. The apparatus according to claim 1, wherein the diffractive optical element is an active diffractive optical element having a variable focal length, and
   wherein the control apparatus is arranged to generate a control signal to the diffractive optical element to control the focal length of the active diffractive optical element to provide the series of image planes.

7. The apparatus according to claim 1, wherein the diffractive optical element is a holographic optical element.

8. The apparatus according to claim 1, wherein the light source comprises a tunable narrowband light source.

9. The apparatus according to claim 1, wherein the source image generation apparatus comprises a projection system having a spatial light modulator arranged to modulate light from the light source in accordance with the image data from the control apparatus.

10. The apparatus according to claim 1, wherein the source image generation apparatus comprises an array of liquid crystal shutters, with the light source arranged as a backlight, operable to form a source image in response to received image data.

11. The apparatus according to claim 1, wherein the light source comprises an array of light emitters that are selectively addressable in dependence on the image data from the control apparatus to form the source image.

12. The apparatus according to claim 1, wherein the light source is operable to output red, green and blue light, and wherein the control apparatus is arranged to control the imaging apparatus and diffractive optical element to provide spatially overlapping red, green and blue image planes.

13. The apparatus according to claim 1, wherein the control apparatus is arranged to provide the series of image planes in a repeating sequence.

14. The apparatus according to claim 1, wherein the control apparatus comprises a processor operable to process an image file comprising three-dimensional data to generate image data for the imaging system in synchronism with the at least one control signal to display a volumetric three-dimensional image corresponding to the three-dimensional data.

15. The apparatus according to claim 14, wherein the processor is arranged to process a sequence of image files to generate a corresponding sequence of volumetric three-dimensional images.

16. The apparatus according to claim 14, wherein the processor performs image processing functions such as scaling, inversion and normalization, or corrections for aberrations or distortion.

17. The apparatus according to claim 1, wherein the imaging system comprises at least two diffractive optical elements.

18. A method of constructing a volumetric image in accordance with three-dimensional image data, the method comprising:
sequentially forming a series of two-dimensional images in accordance with received image data; and
in synchronism with forming the series of images, varying the location of the image plane so that each of the series of images is formed in a respective image plane so as to construct a volumetric three-dimensional image,
wherein the forming of the sequence of images comprises transmitting of light through a diffractive optical element; and
wherein the varying of the location of the image plane comprises adjusting at least one of i) a wavelength of the light transmitted through the diffractive optical element, and ii) a focal length associated with the diffractive optical element.

19. The method according to claim 18, wherein the diffractive optical element has an associated chromatic dispersion and the location of the image plane is varied by varying the wavelength of the light transmitted through the diffractive optical element.

20. The method according to claim 18, wherein the diffractive optical element is a composite diffractive optical element having an array of spatially separated sub-elements, each sub-element having a respective focal length, and the location of the image plane is varied by selectively addressing the array of spatially-separated sub-elements.

* * * * *